US010807306B2

(12) United States Patent
Ochi

(10) Patent No.: US 10,807,306 B2
(45) Date of Patent: Oct. 20, 2020

(54) THREE-DIMENSIONAL-OBJECT FORMING APPARATUS

(71) Applicant: MIMAKI ENGINEERING CO., LTD., Nagano (JP)

(72) Inventor: Kazuhiro Ochi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 443 days.

(21) Appl. No.: 15/671,881

(22) Filed: Aug. 8, 2017

(65) Prior Publication Data

US 2018/0043677 A1 Feb. 15, 2018

(30) Foreign Application Priority Data

Aug. 9, 2016 (JP) .................................. 2016-156916

(51) Int. Cl.
*B29C 64/20* (2017.01)
*B29C 64/112* (2017.01)
(Continued)

(52) U.S. Cl.
CPC ............ *B29C 64/20* (2017.08); *B29C 64/112* (2017.08); *B29C 64/364* (2017.08);
(Continued)

(58) Field of Classification Search
CPC ..... B29C 64/20; B29C 64/112; B29C 64/106; B29C 64/393; B29C 64/209; B29C 64/364; B29C 64/218; B33Y 30/00; B33Y 50/02
See application file for complete search history.

(56) References Cited

U.S. PATENT DOCUMENTS

| | | | | |
|---|---|---|---|---|
| 6,162,378 A | * | 12/2000 | Bedal | B29C 41/52 264/40.1 |
| 2003/0151167 A1 | * | 8/2003 | Kritchman | B29C 41/48 264/401 |

(Continued)

FOREIGN PATENT DOCUMENTS

| | | | |
|---|---|---|---|
| JP | 2004291625 A | | 10/2004 |
| JP | 2015150708 A | * | 8/2015 |

(Continued)

OTHER PUBLICATIONS

Japanese Office Action (JPOA) dated Oct. 1, 2019 issued in the corresponding Japanese patent application No. 2016-156916 and its English translation.

*Primary Examiner* — Joseph S Del Sole
*Assistant Examiner* — Jerzi H Moreno Hernandez
(74) *Attorney, Agent, or Firm* — Rankin, Hill & Clark LLP

(57) ABSTRACT

A three-dimensional-object forming apparatus includes a platform that includes a support surface for a three-dimensional object. An extrusion head is movable relative to the platform in main scanning and sub-scanning directions to extrude a build material to the support surface. A measurer measures an environment temperature around the object on the support surface. A controller includes a storage and a processing unit. The storage stores data of a forming condition in correlation with the environment temperature. The forming condition specifies a condition for a forming operation to form the object. The processing unit causes the platform and the extrusion head to perform the forming operation, updates the forming condition during the forming operation based on the measured environment temperature and the data stored in the storage, and causes the platform (Continued)

and the extrusion head to perform the forming operation under the updated forming condition.

15 Claims, 11 Drawing Sheets

(51) Int. Cl.
*B33Y 30/00* (2015.01)
*B29C 64/364* (2017.01)
*B33Y 50/02* (2015.01)
*B29C 64/393* (2017.01)
*B29C 64/218* (2017.01)
*B29C 64/209* (2017.01)

(52) U.S. Cl.
CPC ............ *B29C 64/393* (2017.08); *B33Y 30/00* (2014.12); *B29C 64/209* (2017.08); *B29C 64/218* (2017.08); *B33Y 50/02* (2014.12)

(56) References Cited

U.S. PATENT DOCUMENTS

| | | | |
|---|---|---|---|
| 2004/0175451 A1* | 9/2004 | Maekawa | B29C 41/36 |
| | | | 425/144 |
| 2007/0029693 A1 | 2/2007 | Wigand et al. | |
| 2008/0192074 A1* | 8/2008 | Dubois | H05K 1/16 |
| | | | 347/5 |
| 2009/0267269 A1* | 10/2009 | Lim | B29C 67/0059 |
| | | | 264/401 |
| 2016/0023395 A1 | 1/2016 | Zhang | |
| 2016/0082666 A1 | 3/2016 | de Pena et al. | |
| 2018/0022020 A1* | 1/2018 | Kawabata | B41J 2/1652 |
| | | | 210/361 |
| 2018/0147773 A1* | 5/2018 | Kalyanaraman | C08G 73/1028 |

FOREIGN PATENT DOCUMENTS

| | | |
|---|---|---|
| JP | 2015150708 A | 8/2015 |
| JP | 2015168202 A | 9/2015 |
| JP | 201660195 A | 4/2016 |

\* cited by examiner

THREE-DIMENSIONAL-OBJECT FORMING APPARATUS

CROSS-REFERENCE TO RELATED APPLICATIONS

The present application claims priority under 35 U.S.C. § 119 to Japanese Patent Application No. 2016-156916, filed Aug. 9, 2016. The contents of this application are incorporated herein by reference in their entirety.

BACKGROUND

Field of the Invention

The present invention relates to a three-dimensional-object forming apparatus.

Discussion of the Background

Three-dimensional-object forming apparatuses form three-dimensional objects by extruding liquid build material from ink-jet heads of the apparatuses and depositing the build material. JP2016-7711A1 discloses a three-dimensional-object forming apparatus that extrudes ultraviolet curable build material from the ink-jet head of the apparatus and irradiates the build material with ultraviolet light so as to cause the build material to cure.

The contents of JP2016-7711A1 are incorporated herein by reference in their entirety.

While the three-dimensional-object forming apparatus is forming a three-dimensional object, heat is generated from sources such as the driving source of the ink-jet head and the light source of the ultraviolet light. Heating makes environment temperature, which is temperature around the three-dimensional object, variable with time, that is, vary as the forming operation progresses. The surface states, such as viscosity and expansion, of the build material extruded from the ink-jet head depend on the environment temperature. When the build material is deposited layer by layer, the surface states of the three-dimensional object may vary from position to position, resulting in a state referred to as unevenness. Thus, there is a need for a configuration that forms a three-dimensional object with such improved accuracy that eliminates or minimizes unevenness.

The present disclosure has been made in view of the above-described circumstances, and it is an object of the present disclosure to provide a three-dimensional-object forming apparatus that forms a three-dimensional object with improved accuracy.

SUMMARY

According to one aspect of the present disclosure, a three-dimensional-object forming apparatus includes a platform, a build-material extrusion head, a measurer, and a controller. The platform includes a support surface on which a three-dimensional object is supportable. The build-material extrusion head is movable relative to the platform in a main scanning direction and a sub-scanning direction so as to extrude a build material to the support surface to form the three-dimensional object. The main scanning direction is approximately parallel to the support surface. The sub-scanning direction is approximately parallel to the support surface and crosses the main scanning direction. The measurer is configured to measure an environment temperature around the three-dimensional object supported on the support surface. The controller includes a storage and a processing unit. The storage is configured to store data of a forming condition in correlation with the environment temperature. The forming condition specifies a condition for the build-material extrusion head and the platform to perform a forming operation. The forming operation includes moving the build-material extrusion head and the platform relative to each other and extruding the build material from the build-material extrusion head to the support surface so as to form the three-dimensional object. The processing unit is configured to cause the platform and the build-material extrusion head to perform the forming operation, configured to, during the forming operation, update the forming condition based on the environment temperature measured by the measurer and based on the data of the forming condition stored in the storage, and configured to cause the platform and the build-material extrusion head to perform the forming operation under the updated forming condition.

In this configuration of the present disclosure, during a forming operation, a forming condition is updated based on environment temperature, which is a temperature around the three-dimensional object, and the forming operation is performed under the updated forming condition. This configuration eliminates or minimizes unevenness of the surface state of the extruded build material when the extruded build material hits the support surface. This configuration, in turn, ensures a three-dimensional object formed with improved accuracy.

In the above-described three-dimensional-object forming apparatus, the build material may include a photo-curable material that is curable by being irradiated with light of a predetermined wavelength. The forming condition may be an illuminance of the light radiated to the build material on the support surface. The controller may be configured to increase the illuminance as the environment temperature measured by the measurer is higher.

In this configuration of the present disclosure, as the environment temperature is higher, the illuminance of the light radiated to the build material on the support surface is increased. This configuration increases the surface curing speed at which the build material cures on the surface. As the environment temperature increases, the internal curing speed at which the three-dimensional object cures on the inside increases. In this respect, the inventor has found that oxygen in the air interferes in the curing of the surface of the build material on the support surface, resulting in lowered speed at which the build material cures on the surface. The inventor also has found that a difference in the speed of curing between the surface and inside of the three-dimensional object may cause the three-dimensional object to bend. The above-described configuration of the present disclosure increases the speed at which the build material on the support surface cures on the surface of the build material, and this eliminates or minimizes a difference in the speed of curing between the surface and inside of the three-dimensional object. This configuration, as a result, eliminates or minimizes bending of the three-dimensional object.

The above-described three-dimensional-object forming apparatus may further include a support-material extrusion head that is movable together with the build-material extrusion head and that is configured to extrude a support material to the support surface to support the build material. When the build material is extruded to a first region on the support surface and the support material is extruded to a second region abutting the first region on the support surface, the forming condition may be a size of a gap between the build material and the support material. When the environment temperature measured by the measurer is higher than a predetermined temperature, the controller may be configured to make the size of the gap equivalent to at least one dot of the build material, and may be configured to increase the size of the gap as the environment temperature measured by the measurer is higher.

When the build material is extruded from the build-material extrusion head and hits the support surface, the build material expands over a wider area as the environment temperature is higher. In the above configuration of the present disclosure, the gap between the build material and the support material is enlarged as the environment temperature measured by the measurer is higher. The enlarged gap prevents the build material from expanding and being mixed with the support material.

The above-described three-dimensional-object forming apparatus may further include a clear-material extrusion head that is movable together with the build-material extrusion head and that is configured to extrude a clear material. The forming condition may be an amount of extrusion of the clear material. When the environment temperature measured by the measurer is higher than a predetermined temperature, the controller may be configured to control the clear-material extrusion head to extrude the clear material to a position to which the build material is extruded, and may be configured to increase the amount of extrusion of the clear material as the environment temperature measured by the measurer is higher.

When the build material is extruded from the build-material extrusion head and hits the support surface, the build material expands over a wider area, decreasing in height accordingly, as the temperature around the build material is higher. In the above configuration of the present disclosure, as the environment temperature measured by the measurer is higher, the amount of extrusion of the clear build material is increased so as to compensate for the lowered height of the build material.

The above-described three-dimensional-object forming apparatus may further include a flattening roller that is configured to rotate on the build material on the support surface and that is configured to travel across the support surface in a direction approximately parallel to the support surface so as to flatten the build material. The forming condition may be a rotation speed of the flattening roller. The controller may be configured to increase the rotation speed as the environment temperature measured by the measurer is higher.

When the build material is extruded from the build-material extrusion head and hits the support surface, the build material increases in viscosity as the temperature around the build material is higher. If the build material increases in viscosity, the build material becomes more liable to adhere to the flattening roller and more liable to move together with the movement of the flattening roller. In the above configuration of the present disclosure, as the environment temperature measured by the measurer is higher, the rotation speed of the flattening roller increases. This configuration makes it more difficult for the flattening roller to adhere to the build material. This configuration, in turn, eliminates or minimizes the movement of the build material together with the movement of the flattening roller.

In the above-described three-dimensional-object forming apparatus, the forming condition may be a temperature of a path for the build material. The path includes the build-material extrusion head and a supply unit. The controller may be configured to lower the temperature of the path as the environment temperature measured by the measurer is higher.

In this configuration of the present disclosure, the temperature of the path is lowered as the environment temperature measured by the measurer is higher. This configuration eliminates or minimizes change in the temperature of the build material on the support surface or the temperature of the three-dimensional object.

In the above-described three-dimensional-object forming apparatus, the build material may include a photo-curable material that is curable by being irradiated with light of a predetermined wavelength. The forming condition may be the wavelength of the light radiated to the build material on the platform. The controller may be configured to shorten the wavelength as the environment temperature measured by the measurer is higher.

In this configuration of the present disclosure, the wavelength of the light is shortened as the environment temperature is higher. This configuration increases the speed at which the build material on the support surface cures on the surface of the build material. This configuration, in turn, eliminates or minimizes a difference in the speed of curing between the surface and inside of the three-dimensional object, and as a result, eliminates or minimizes bending of the three-dimensional object.

The embodiment of the present invention forms a three-dimensional object with improved accuracy.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

A three-dimensional-object forming apparatus according to an embodiment will be described in detail below by referring to the accompanying drawings. It will be understood that the embodiment is not intended in a limiting sense. The elements and/or components described in the embodiment encompasses those elements and/or components readily found by one of ordinary skill in the art as replacements, and encompasses substantially identical elements and/or components.

Figure 1:
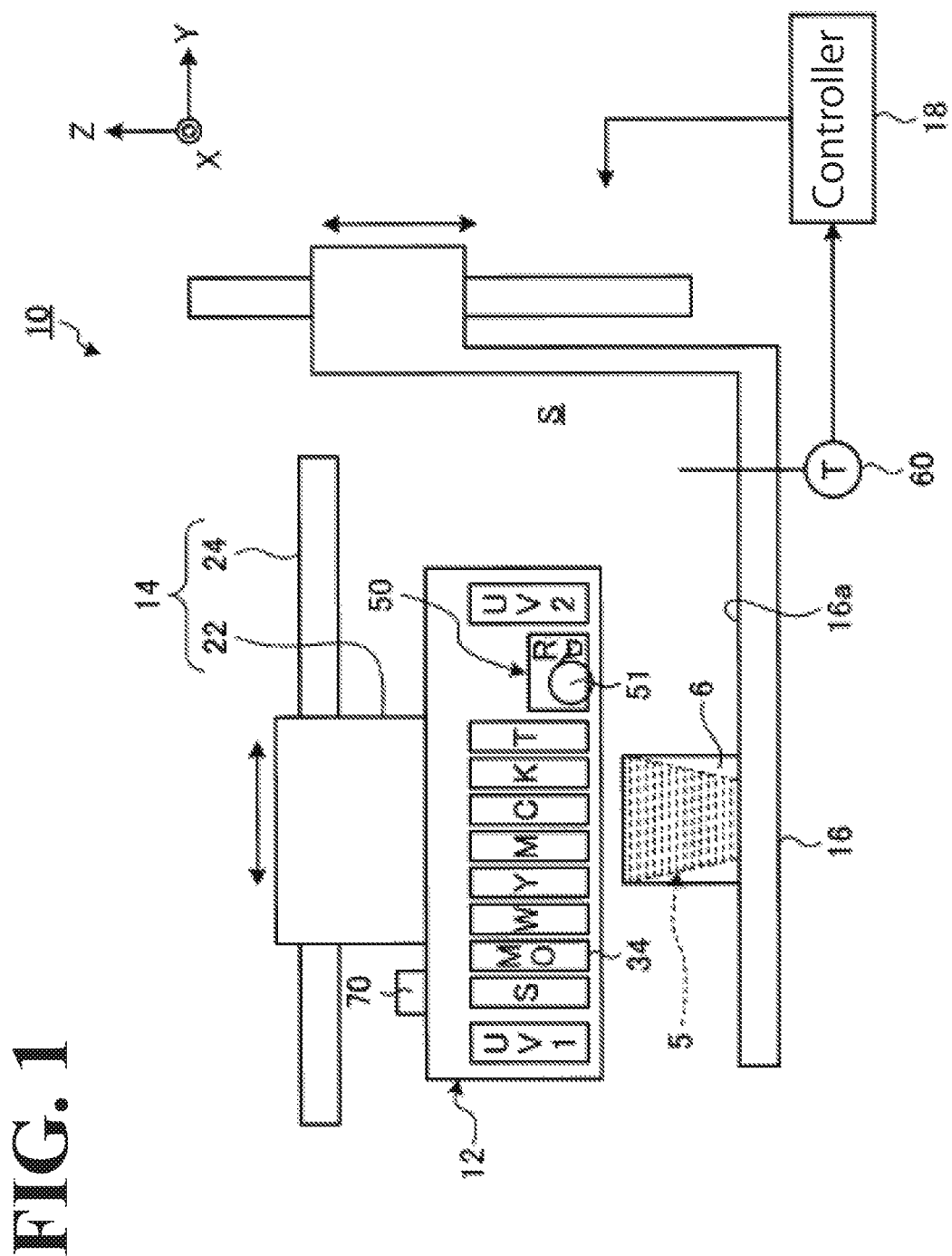
FIG. 1 is a schematic illustrating a three-dimensional-object forming apparatus according to an embodiment used in a method for producing a three-dimensional object.

FIG. 1 is a schematic illustrating a three-dimensional-object forming apparatus 10 according to an embodiment used in a method for producing a three-dimensional object. The three-dimensional-object forming apparatus 10 illustrated in FIG. 1 is a three-dimensional printer that forms a three-dimensional object 5 by additive manufacturing technology. As used herein, additive manufacturing refers to a method for forming the three-dimensional object 5 by depositing a plurality of layers. Also as used herein, the three-dimensional object 5 refers to a three-dimensional structure. The three-dimensional-object forming apparatus 10 implements a three-dimensional forming method. A non-limiting example of the three-dimensional forming method is a color forming method for forming a three-dimensional structure based on shape information and color image information of the three-dimensional structure.

Except as specified below, the three-dimensional-object forming apparatus 10 may be identical or similar in configuration to known three-dimensional-object forming apparatuses. A non-limiting example of the three-dimensional-object forming apparatus 10 is a partially modified known ink-jet printer that prints on a plane. Another non-limiting example of the three-dimensional-object forming apparatus 10 is a partially modified ink-jet printer that uses ultraviolet curable ink (UV ink).

The three-dimensional-object forming apparatus 10 according to this embodiment includes an extrusion unit 12, a main scanning driver 14, a platform 16, and a controller 18. The platform 16 is a table on which the three-dimensional object 5 is placed. The extrusion unit 12 and the platform 16 are disposed in an internal space S of a housing, not illustrated. The space S may be sealed against external devices and/or apparatuses.

The extrusion unit 12 extrudes droplets of build material of the three-dimensional object 5. Specifically, the extrusion unit 12 extrudes droplets of curable resin curable under a predetermined condition(s) and causes the curable resin to cure so as to form layers constituting the three-dimensional object 5. More specifically, the extrusion unit 12 repeats a layer forming operation and a curing operation a plurality of times at a command from the controller 18. The layer forming operation is to extrude droplets to form a layer of the curable resin. The curing operation is to cause the layer of the curable resin formed in the layer forming operation to cure. By repeating the layer forming operation and the curing operation, the extrusion unit 12 forms a plurality of layers of cured resin.

A non-limiting example of the curable resin extruded from the extrusion unit 12 is ultraviolet curable resin curable by being irradiated with ultraviolet light. In this case, the droplets of build material of the three-dimensional object 5 extruded from the extrusion unit 12 are ink droplets of ultraviolet curable ink. In the curing operation, an ultraviolet light source is used for ultraviolet radiation to cause the curable resin layer to cure. As used herein, the curable resin layer refers to ultraviolet curable ink.

In the three-dimensional-object forming apparatus 10 according to embodiment, the extrusion unit 12 extrudes color ink droplets of ultraviolet curable ink to color the surface or inside of the three-dimensional object 5, so that a colored three-dimensional object 5 is formed. In the formation of the three-dimensional object 5, the extrusion unit 12 forms a support 6 around the three-dimensional object 5, as illustrated in FIG. 1. The support 6 is a layered structure (support layers) to support the three-dimensional object 5 being formed and is dissolved off the three-dimensional object 5 using water or other removing means after completion of the three-dimensional object 5.

The main scanning driver 14 causes the extrusion unit 12 to perform a main scanning operation. As used herein, causing the extrusion unit 12 to perform the main scanning operation refers to causing the ink-jet heads of the extrusion unit 12 to perform the main scanning operation. Also as used herein, the main scanning operation refers to an operation to move in a main scanning direction set in advance (the Y direction in FIG. 1) and extrude ink droplets.

The main scanning driver 14 includes a carriage and a guide rail 24. The carriage 22 holds the extrusion unit 12 with the extrusion unit 12 facing the platform 16. That is, the carriage 22 holds the extrusion unit 12 so that ink droplets are extruded from the extrusion unit 12 in a direction toward the platform 16. In the main scanning operation, the carriage 22 holding the extrusion unit 12 moves along the guide rail 24. The guide rail 24 guides the movement of the carriage 22 and, in the main scanning operation, allows the carriage 22 to move at a command from the controller 18.

It will be understood that the movement of the extrusion unit 12 in the main scanning operation may be relative to the three-dimensional object 5. For example, in a possible modification of the three-dimensional-object forming apparatus 10, it may be the three-dimensional object 5 that moves, which can be implemented by causing the platform 16 to move while keeping the position of the extrusion unit 12 fixed.

The platform 16 is a table for the three-dimensional object 5 being formed to be placed on the upper surface of the platform 16. The platform 16 has a function to move its upper surface in vertical directions (the Z direction in FIG. 1) and, at a command from the controller 18, moves the upper surface according to progress of the formation of the three-dimensional object 5. This configuration enables the distance (gap) between the extrusion unit 12 and the build surface of the three-dimensional object 5 being formed to be adjusted approximately. As used herein, the build surface of the three-dimensional object 5 refers to the last deposited layer of the three-dimensional object 5 that becomes the foundation upon which the next layer is formed by the extrusion unit 12. In Z-direction scanning, the platform 16 may be moved in vertical directions relative to the extrusion unit 12 or the extrusion unit 12 may be moved in vertical directions relative to the platform 16.

It will be understood that the three-dimensional-object forming apparatus 10 may include any of various other configurations necessary for formation, coloring, and/or other operations associated with the three-dimensional object 5. For example, the three-dimensional-object forming apparatus 10 may include a sub-scanning driver that causes the extrusion unit 12 to perform a sub-scanning operation. As used herein, the sub-scanning operation refers to an operation to move, relative to the three-dimensional object 5 being formed, the ink-jet heads of the extrusion unit 12 in a sub-scanning direction (the X direction in FIG. 1), which is approximately orthogonal to the main scanning direction. The sub-scanning driver causes the extrusion unit 12 to perform the sub-scanning operation as necessary when, for example, the length in the sub-scanning direction of the three-dimensional object 5 to be formed is greater than formable width of the ink-jet heads of the extrusion unit 12. More specifically, the sub-scanning driver may be a driver that causes the platform 16 to move in the sub-scanning direction or may be a driver that causes the guide rail 24 to move in the sub-scanning direction together with the carriage 22 holding the extrusion unit 12.

Figure 2:
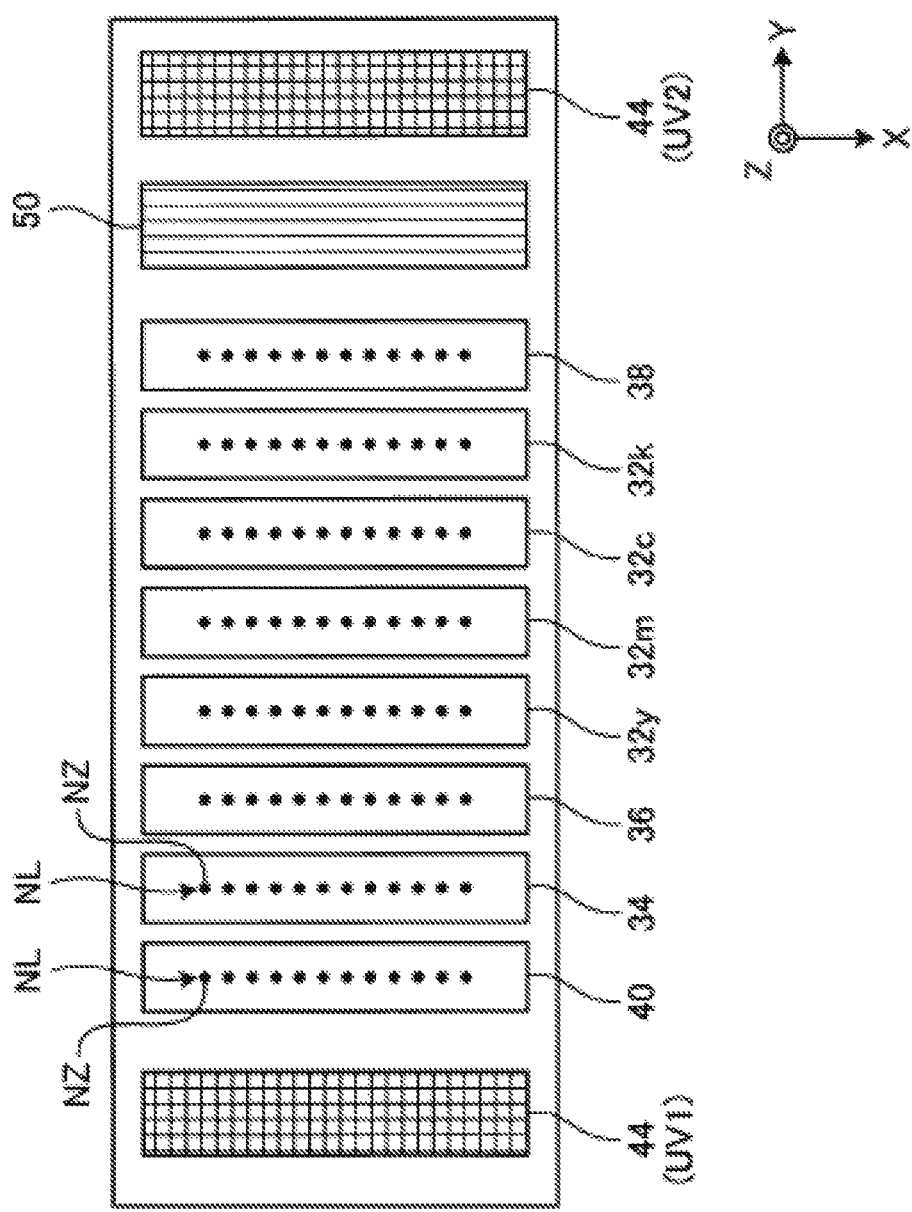
FIG. 2 illustrates an extrusion unit as viewed from the surface from which ink droplets are extruded.

FIG. 2 illustrates the extrusion unit 12 as viewed from the surface from which ink droplets are extruded. The extrusion unit 12 includes a plurality of color-ink heads 32y, 32m, 32c, and 32k (hereinafter referred to as color-ink heads 32y to 32k), a while-ink head 36, a clear-ink head 38, a build-material extrusion head 34, a support-material extrusion head 40, a plurality of ultraviolet light sources 44, and a flattening roller unit 50.

The color-ink heads 32y to 32k, the while-ink head 36, the clear-ink head 38, and the build-material extrusion head. 34 are extrusion heads that extrude droplets of curable resin by ink-jet technology. The color-ink heads 32y to 32k, the while-ink head 36, the clear-ink head 38, and the build-material extrusion head 34 are ink-jet heads that extrude droplets of ultraviolet curable ink, and are aligned in the main scanning direction (Y direction) and disposed at a position in the sub-scanning direction (X direction) suitable for extruding purposes.

The color-ink heads 32y to 32k are each an ink-jet head that extrudes droplets of a different color ink. The color-ink head 32y extrudes droplets of ultraviolet curable ink of yellow. The color-ink head 32m extrudes droplets of ultraviolet curable ink of magenta. The color-ink head 32c extrudes droplets of ultraviolet curable ink of cyan. The color-ink head 32k extrudes droplets of ultraviolet curable ink of black. The while-ink head 36 extrudes droplets of ultraviolet curable ink of white.

The clear-ink head 38 extrudes droplets of ultraviolet curable clear ink. As used herein, clear ink refers to an ink of clear color, which is transparent or colorless. The clear ink contains ultraviolet curable resin and contains no coloring agent.

The build-material extrusion head 34 is an ink-jet head that extrudes droplets of a flowable build material of the three-dimensional object 5. The build material is an ultraviolet curable ink. The build-material extrusion head 34 extrudes droplets of a forming-purpose ink (MO) of a predetermined color. Examples of the forming-purpose ink include, but are not limited to, white ink and clear ink.

The support-material extrusion head 40 is an ink-jet head that extrudes ink droplets containing the support material of the support 6 (see FIG. 1). A non-limiting example of the support material is a water soluble material that is soluble with water after the three-dimensional object 5 has been formed. It will be understood that the support material of the support 6 may be any known material suitable for the support 6. The support-material extrusion head 40 is aligned with the color-ink heads 32y to 32k, the while-ink head 36, the clear-ink head 38, and the build-material extrusion head 34 in the main scanning direction, and is disposed at a position in the sub-scanning direction suitable for supporting purposes.

These heads are connected to respective ink chambers, not illustrated, through predetermined ink paths. A non-limiting example of each ink chamber is a cartridge attachable and detachable to and from the three-dimensional-object forming apparatus 10. Another non-limiting example of each ink chamber is a structure mounted on the exterior of the three-dimensional-object forming apparatus 10. Each head is supplied ink flowing from the ink chamber through the ink path. The ink path may include a subsidiary tank, not illustrated.

It will be understood that any known ink-jet heads may be used as the color-ink heads 32y to 32k, the while-ink head 36, the clear-ink head 38, the build-material extrusion head 34, and the support-material extrusion head 40. Each of these ink-jet heads includes a nozzle array NL on the surface of each ink-jet head facing the platform 16 (see FIG. 1). The nozzle array NL is made up of a plurality of nozzles NZ aligned in the sub-scanning direction. The nozzle arrays NL of the ink-jet heads are aligned with each other in approximately the same direction and are approximately parallel to each other. In the main scanning operation, each ink-jet head extrudes ink droplets in the Z direction while the extrusion unit 12 is moving in the main scanning direction, which is approximately orthogonal to the direction in which the nozzles NZ of each ink-jet head are aligned.

The plurality of ultraviolet light sources 44 are light sources of ultraviolet light that causes ultraviolet curable ink to cure. Examples of the ultraviolet light source 44 include, but are not limited to, an ultraviolet LED (Light-Emitting Diode), a metal halide lamp, and a mercury lamp. One ultraviolet light source 44 is disposed at one end of the extrusion unit 12 in the main scanning direction and the other ultraviolet light source 44 is disposed at the other end of the extrusion unit 12 in the main scanning direction. Thus, the plurality of ultraviolet light sources 44 are arranged to hold the color-ink heads 32y to 32k, the while-ink head 36, the clear-ink head 38, the build-material extrusion head 34, and the support-material extrusion head 40 between the plurality of ultraviolet light sources 44. In the three-dimensional-object forming apparatus 10 according to this embodiment, the ultraviolet light sources 44 include UV1 and UV2. The UV1 is disposed at one end of the extrusion unit 12 in the main scanning direction (the Y direction), and the UV2 is disposed at the other end of the extrusion unit 12 in the main scanning direction (the Y direction). The ultraviolet light sources 44 are capable of adjusting their illuminance and capable of radiating ultraviolet light of a plurality of different wavelengths.

The flattening roller unit 50 is a configuration that flattens layers of ultraviolet curable ink formed during the formation of the three-dimensional object 5. The flattening roller unit 50 is disposed between the UV2, which is the ultraviolet light source 44 disposed at the other end of the extrusion unit 12, and the array of the color-ink heads 32y to 32k, the while-ink head 36, the clear-ink head 38, the build-material extrusion head 34, and the support-material extrusion head 40. More specifically, the flattening roller unit 50 is aligned in the main scanning direction with the array of the color-ink heads 32y to 32k, the while-ink head 36, the clear-ink head 38, the build-material extrusion head 34, and the support-material extrusion head 40, and is disposed at a position in the sub-scanning direction suitable for flattening purposes relative to the array of the color-ink heads 32y to 32k, the while-ink head 36, the clear-ink head 38, the build-material extrusion head 34, and the support-material extrusion head 40. The flattening roller unit 50 is disposed in the extrusion unit 12 and movable in vertical directions relative to the extrusion unit 12. The flattening roller unit 50 includes a rotatable flattening roller 51 and an excess build material collection mechanism 52 (see FIG. 1). The flattening roller 51 is movable in the main scanning direction (the direction in FIGS. 1 and 2) together with the carriage 22 to remove excess part of flowable build material. The excess build material collection mechanism 52 collects the excess build material removed by the flattening roller 51.

The three-dimensional-object forming apparatus 10 includes a measurer 60 and a temperature regulator 70. The measurer 60 measures environment temperature. The environment temperature is a temperature of the environment surrounding the three-dimensional object 5 being formed. The measurer 60 may be disposed at the extrusion unit 12 or the platform 16. Examples of the environment temperature measured by the measurer 60 include, but are not limited to, the temperature of the atmosphere of the space S, the temperature of the ink of each head, the temperature of the support surface, 16a, of the platform 16. The measurer 60 may also measure temperatures at a plurality of different positions. The measurer 60 sends the measured environment temperature to the controller 18. The temperature regulator 70 is capable of adjusting the temperature of each of the ink paths of the extrusion unit 12. As used herein, the ink path encompasses the corresponding head.

The controller 18 controls the elements of the three-dimensional-object forming apparatus 10, and includes a Central Processing Unit (CPU), a Random Access Memory (RAM), and a Read Only Memory (ROM). The CPU serves as a controller to perform various kinds of processing. The RAM and ROM serve as memories to store various kinds of information. The controller 18 controls the elements of the three-dimensional-object forming apparatus 10 based on information about the three-dimensional object 5 to be formed, such as shape information and color image information. In this manner, the controller 18 controls the forming operation to form the three-dimensional object 5.

Figure 3:
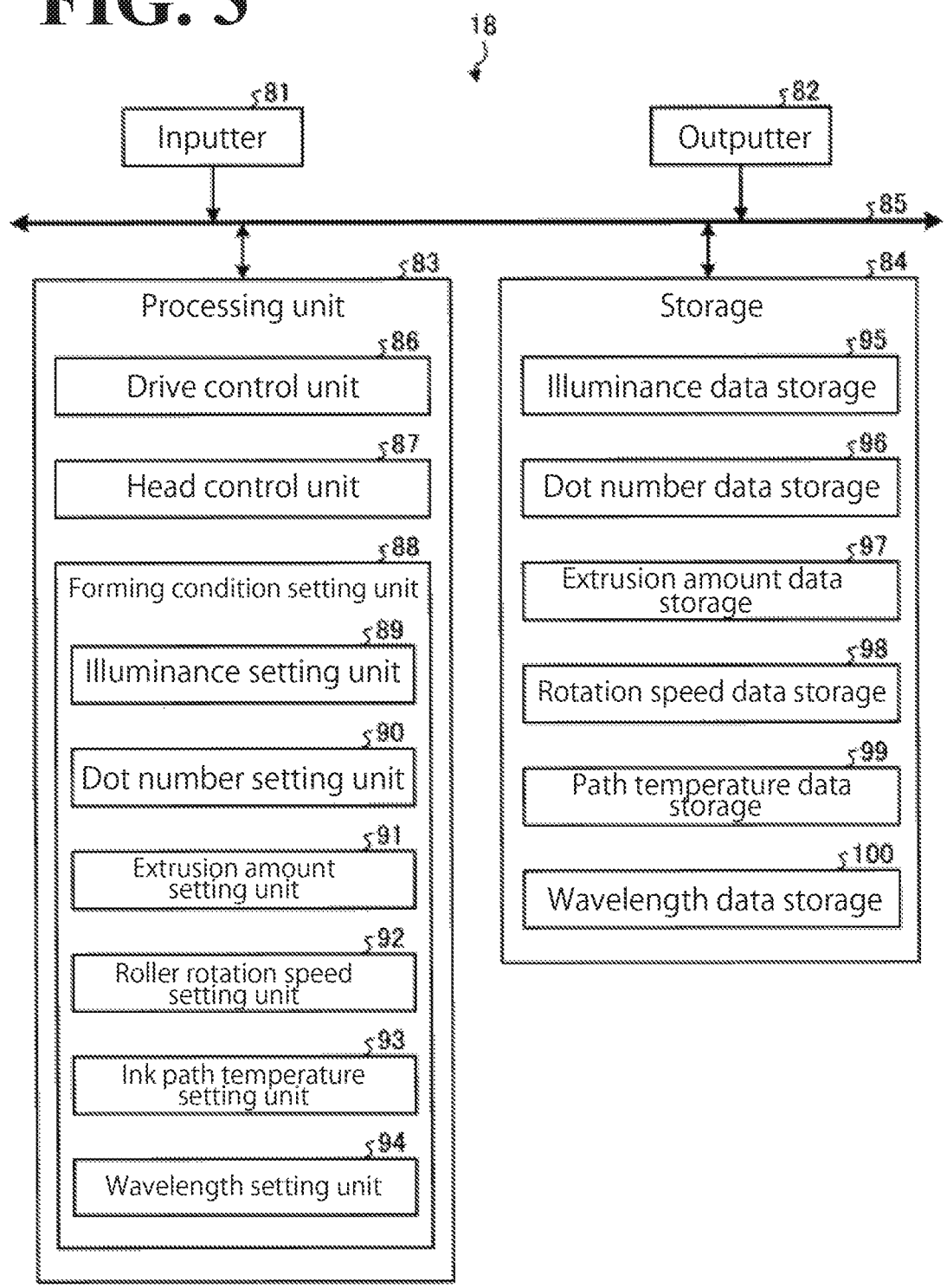
FIG. 3 is a functional block diagram of a controller.

FIG. 3 is a functional block diagram of the controller 18. As illustrated in FIG. 3, the controller 18 includes an inputter 81, an outputter 82, a processing unit 83, and a storage 84. The inputter 81 receives data and/or information such as data input from a personal computer or other external apparatus or device, not illustrated, and also receives the environment temperature measured by the measurer 60. The outputter 82 outputs signals such as control signals to control the forming operation.

The processing unit 83 includes a drive control unit 86, a head control unit 87, and a forming condition setting unit 88. The drive control unit 86 controls the movement of the extrusion unit 12 and the movement of the platform 16. The head control unit 87 controls the operation of the ultraviolet light sources 44 and the operation of the flattening roller unit 50, as well as controlling the extruding operations of the color-ink heads 32y to 32k, the while-ink head 36, the clear-ink head 38, the build-material extrusion head 34, and the support-material extrusion head 40.

The forming condition setting unit 88 sets a forming condition(s) for the forming operation. Examples of the forming condition include, but are not limited to, the illuminance of the ultraviolet light radiated front each ultraviolet light source 44, the size of the gap between the support material and the build material, the amount of extrusion of the clear ink from the clear-ink head 38, the rotation speed of the flattening roller 51 of the flattening roller unit 50, the temperature of each ink path, including the corresponding head, and the wavelength of the ultraviolet light radiated from each ultraviolet light source 44.

The forming condition setting unit 88 includes an illuminance setting unit 89, a dot number setting unit 90, an extrusion amount setting unit 91, a roller rotation speed setting unit 92, an ink path temperature setting unit 93, and a wavelength setting unit 94. The illuminance setting unit 89 adjusts the output of each of light-emitting chips disposed in each ultraviolet light source 44 so as to set the illuminance of the ultraviolet light radiated from each ultraviolet light source 44.

The dot number setting unit 90 sets a gap equivalent to at least one dot of the build material between the support material and the build material when, for example, the environment temperature measured by the measurer 60 is higher than a predetermined temperature. The predetermined temperature may be conveniently set based on, for example, an experiment and/or a simulation. The dot number setting unit 90 sets the size of the gap based on the environment temperature measured by the measurer 60. Specifically, the dot number setting unit 90 may set the size of the gap in terms of the number of dots of the build material.

When the environment temperature measured by the measurer 60 is higher than the predetermined temperature, the extrusion amount setting unit 91 causes the clear-material extrusion head 38 to extrude clear ink to the position to which the build material is extruded. The extrusion amount setting unit 91 also sets, based on the environment temperature measured by the measurer 60, the amount of extrusion of the clear ink to be added to the build material.

The roller rotation speed setting unit 92 sets the rotation speed of the flattening roller 51 of the flattening roller unit 50 based on the environment temperature measured by the measurer 60. The ink path temperature setting unit 93 controls the temperature regulator 70 based on the environment temperature measured by the measurer 60 so as to set the temperature of each ink path, including the corresponding head. The wavelength setting unit 94 selects a light-emitting chip from among a plurality of light-emitting chips disposed in each ultraviolet light source 44, and causes the selected light-emitting chip to emit light. The plurality of light-emitting chips respectively correspond to a plurality of kinds of wavelengths. In this manner, the wavelength setting unit 94 sets the wavelength of the ultraviolet light radiated from each ultraviolet light source 44.

Figure 4:
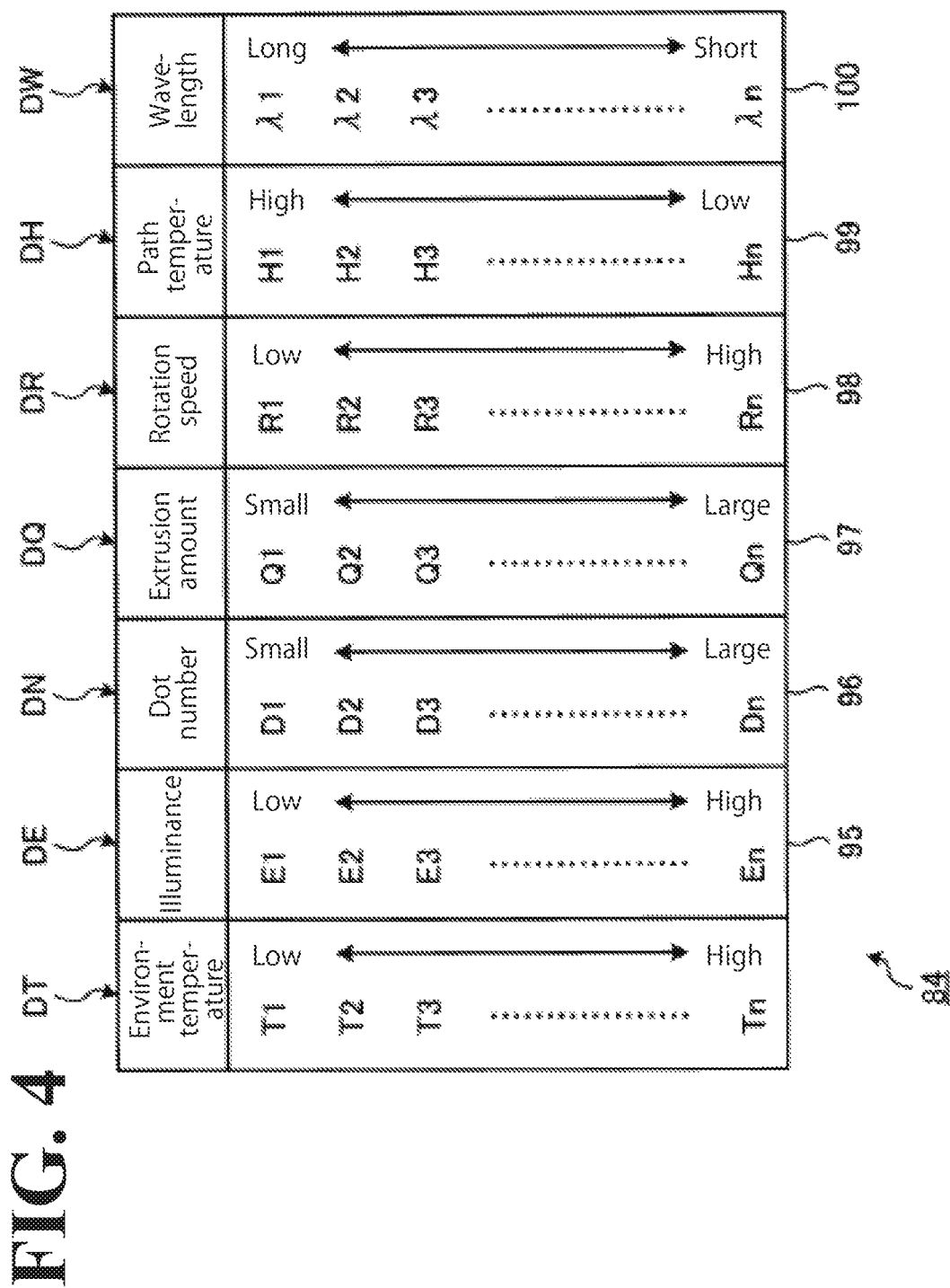
FIG. 4 illustrates a data table as an example of data stored in a storage.

The storage 84 includes an illuminance data storage 95, a dot number data storage 96, an extrusion amount data storage 97, a rotation speed data storage 98, a path temperature data storage 99, and a wavelength data storage 100. FIG. 4 illustrates a data table as an example of data stored in the storage 84. As illustrated in FIG. 4, each of these elements of the storage 84 store data corresponding to temperature data DT of the environment temperature measured by the measurer 60. The temperature data DT of the environment temperature includes environment temperature T1, which is a temperature at the initial state of the forming operation.

The illuminance data storage 95 stores illuminance data DE, which corresponds to the temperature data DT. The illuminance data DE is data of the illuminance of the ultraviolet light radiated from each ultraviolet light source 44. The illuminance data storage 95 correlates the temperature data DT with the illuminance data DE so that the illuminance of the ultraviolet light is higher as the environment temperature is higher.

The dot number data storage 96 stores dot number data DD, which corresponds to the temperature data DT. The dot number data DD is data about the size of the gap between the support material and the build material. The dot number data DD represents the size of the gap in terms of the number of dots of the build material. That is, the dot number data DD is two-dimensional data that is included in the three-dimensional shape data input into the three-dimensional-object forming apparatus 10 and that represents the build material in terms of extrusion dot number. The dot number data storage 96 correlates the temperature data DT with the dot number data DD so that the dot number is larger as the environment temperature is higher. For example, dot number D1 corresponds to the environment temperature T1 and may be set at zero. The above-described predetermined temperature may be set at environment temperature T2, and dot number D2, which corresponds to the environment temperature T2, may be set at a value greater than zero.

The extrusion amount data storage 97 stores extrusion amount data DQ, which corresponds to the temperature data DT. The extrusion amount data DQ is data of the amount of extrusion of the clear ink from the clear-ink head 38. The extrusion amount data storage 97 correlates the temperature data DT with the illuminance data DE so that the amount of extrusion of the clear ink to be added to the build material is larger as the environment temperature is higher. Extrusion amount Q1 corresponds to the environment temperature T1 and may be set at zero. The above-described predetermined temperature may be set at environment temperature T2, and extrusion amounts Q2, Q3, . . . Qn may be set at a value greater than zero.

The rotation speed data storage 98 stores rotation speed data DR, which corresponds to the temperature data DT. The rotation speed data DR is data of the rotation speed of the flattening roller 51 of the flattening roller unit 50. The rotation speed data storage 98 correlates the temperature data DT with the rotation speed data DR so that the rotation speed of the flattening roller 51 is higher as the environment temperature is higher.

The path temperature data storage 99 stores path temperature data DH, which corresponds to the temperature data DT. The path temperature data DH is data of the temperature of each ink path, including the corresponding head. The path temperature data storage 99 correlates the temperature data DT with the path temperature data DH so that the temperature of the path is higher as the environment temperature is higher.

The wavelength data storage 100 stores wavelength data DW, which corresponds to the temperature data DT. The wavelength data DW is data of the wavelength of the ultraviolet light radiated from each ultraviolet light source 44. The wavelength data storage 100 correlates the temperature data DT with the wavelength data DW so that the wavelength of the ultraviolet light is shorter as the environment temperature is higher.

Figure 5:
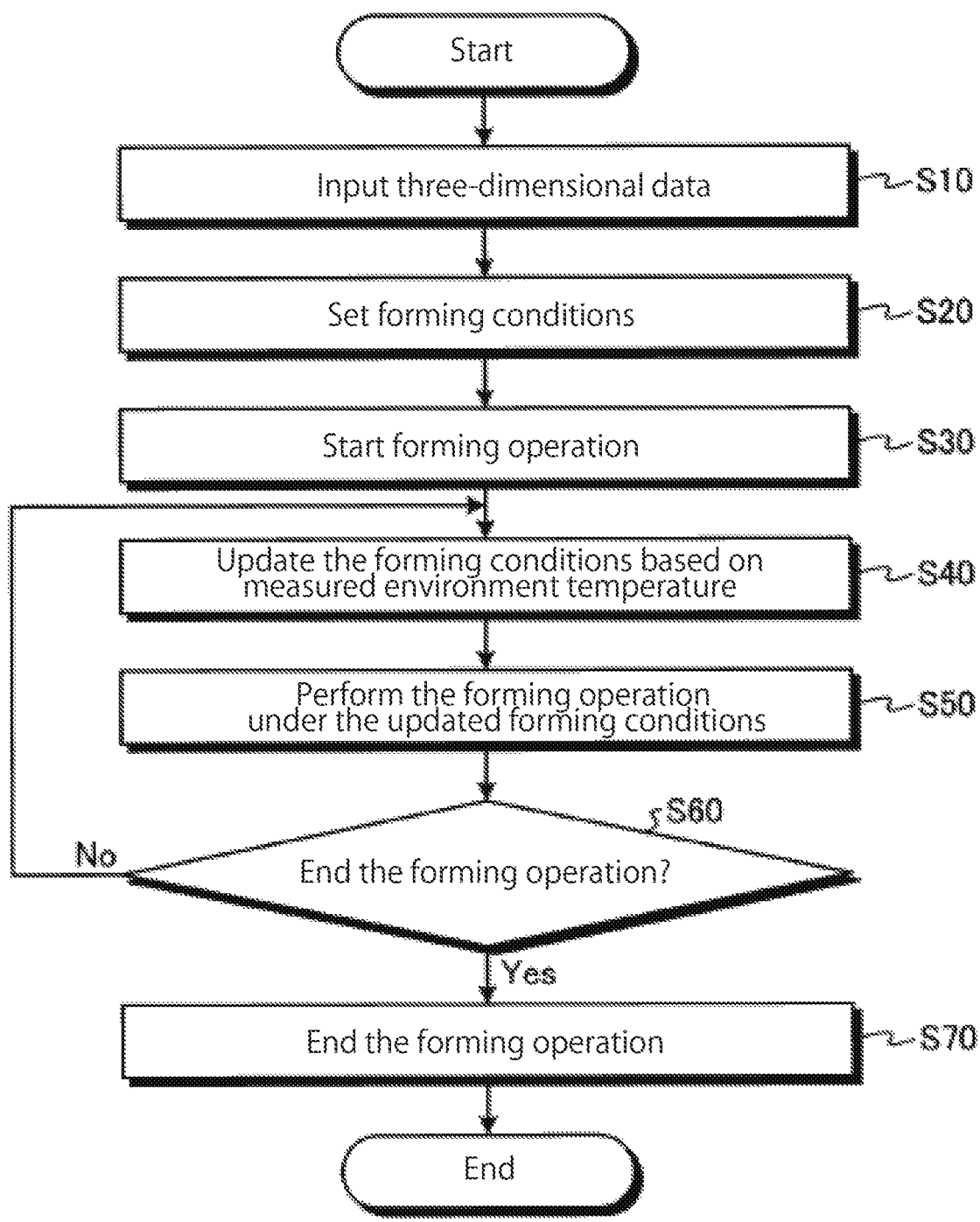
FIG. 5 is a flowchart of operations performed by the three-dimensional-object forming apparatus.

Next, how the three-dimensional-object forming apparatus 10 operates will be described. FIG. 5 is a flowchart of operations performed by the three-dimensional-object forming apparatus 10. As illustrated in FIG. 5, at step S10, the controller 18 receives three-dimensional data input from an external apparatus or device. Based on the input three-dimensional data, the controller 18 sets initial forming conditions (step S20), and implements a forming operation based on the forming conditions (step S30). For example, the controller 18 sets such forming conditions in the storage 84 that correspond to the environment temperature T1. Specifically, the forming conditions are illuminance E1, 0-th row of the nozzle array, the extrusion amount Q1, rotation speed R1, path temperature H1, and the wavelength DW.

The controller 18, during the forming operation, updates the forming conditions based on the environment temperature measured by the measurer 60 (step S40), and implements the forming operation under the updated forming conditions (step S50). In this case, the forming conditions to be updated are the illuminance of the ultraviolet light radiated from each ultraviolet light source 44, the size of the gap between the support material and the build material, the amount of extrusion of the clear ink from the clear-ink head 38, the rotation speed of the flattening roller 51 of the flattening roller unit 50, the temperature of each ink path, including the corresponding head, and the wavelength of the ultraviolet light radiated from each ultraviolet light source 44.

Figure 6:
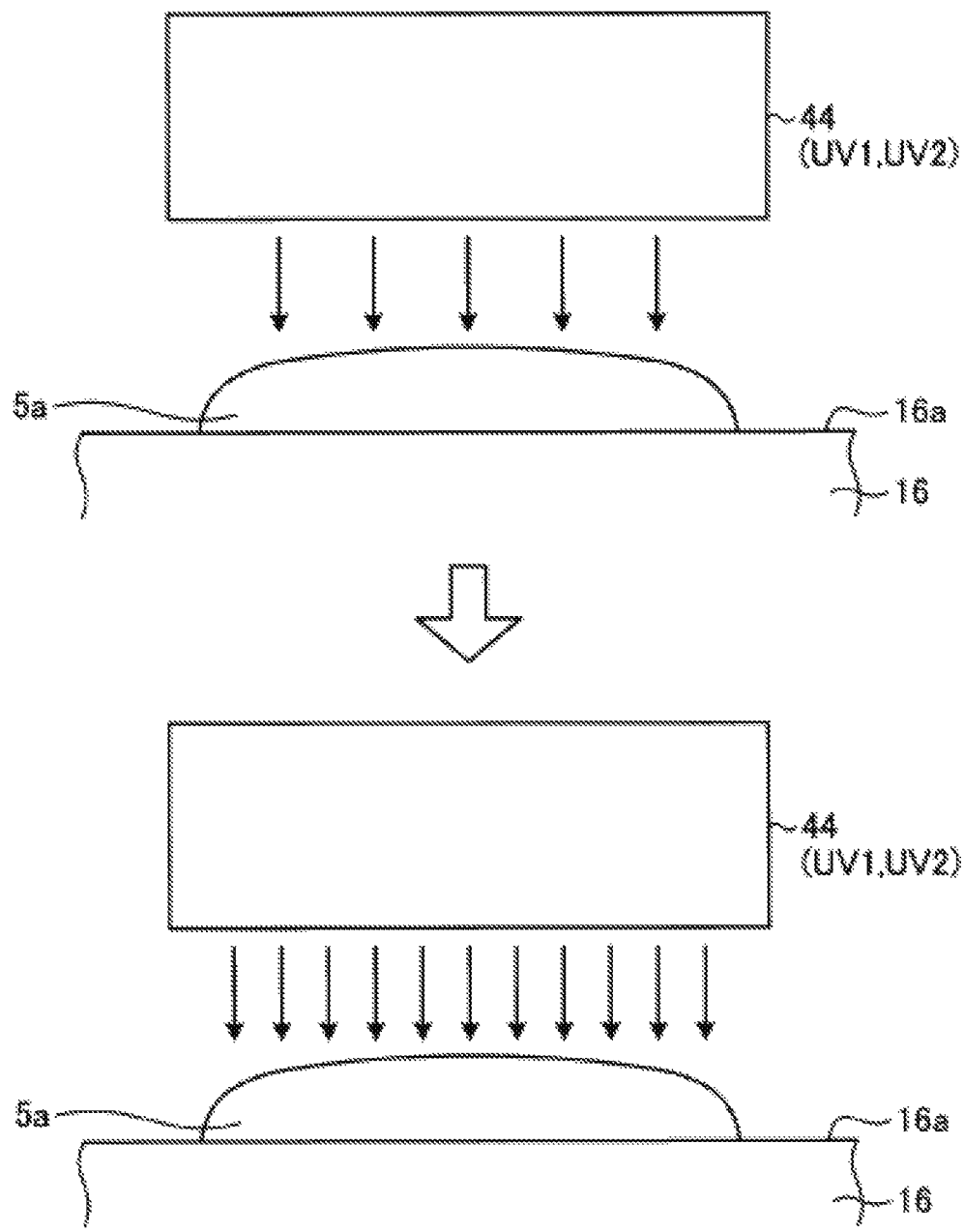
FIG. 6 illustrates a comparison between a pre-update forming operation, which is before a forming condition is updated, and a post-update forming operation, which is after the forming condition is updated.

FIGS. 6 to 11 each illustrate a comparison between a pre-update forming operation, which is before a forming condition is updated, and a post-update forming operation, which is after the forming condition is updated. FIG. 6 illustrates an example of change in the illuminance of the ultraviolet light. The upper half of FIG. 6 illustrates an initial stage of a forming operation (which is when the environment temperature is T1). In this case, the ultraviolet light sources 44 radiates ultraviolet light of illuminance E1 to a build material 5a on the support surface 16a of the platform 16.

When, from this initial stage, the environment temperature increases and the environment temperature measured by the measurer 60 is Tn (Tn>T1), the illuminance setting unit 89 obtains from the illuminance data storage 95 an illuminance En corresponding to the environment temperature Tn. Then, the illuminance setting unit 89 updates the previous forming condition of illuminance using the new forming condition, namely, the obtained illuminance En. After the previous forming condition has been updated, as illustrated in the lower half of FIG. 6, the ultraviolet light sources 44 radiate ultraviolet light of higher illuminance than the pre-update illuminance to the build material 5a on the support surface 16a.

As the environment temperature increases, the internal curing speed at which the build material 5a on the support surface 16a cures on the inside increases. In this respect, the inventor has found that oxygen in the air interferes in the curing of the surface of the build material 5a on the support surface 16a, resulting in lowered surface curing speed at which the build material 5a cures on the surface. In light of the finding, in this embodiment, the illuminance of the ultraviolet light radiated from the ultraviolet light sources 44 is higher than the illuminance before the environment temperature increases. This configuration increases the surface curing speed at which the build material 5a cures on the surface. This configuration, in turn, eliminates or minimizes a difference in curing speed between the surface and inside of the build material 5a. This configuration, as a result, eliminates or minimizes bending of the three-dimensional object 5.

Figure 7:
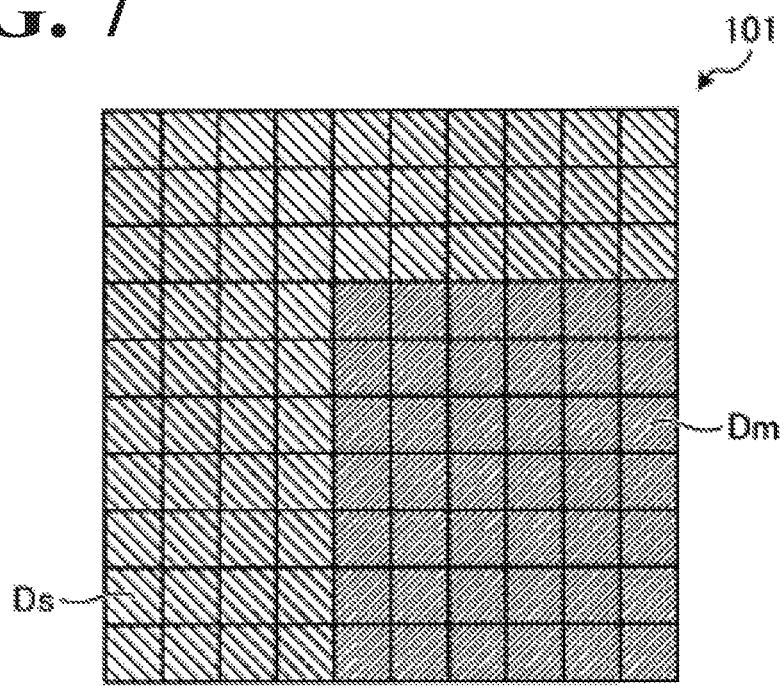
FIG. 7 illustrates a comparison between a pre-update forming operation, which is before a forming condition is updated, and a post-update forming operation, which is after the forming condition is updated.
Figure 7:
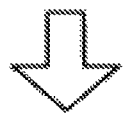
Figure 7:
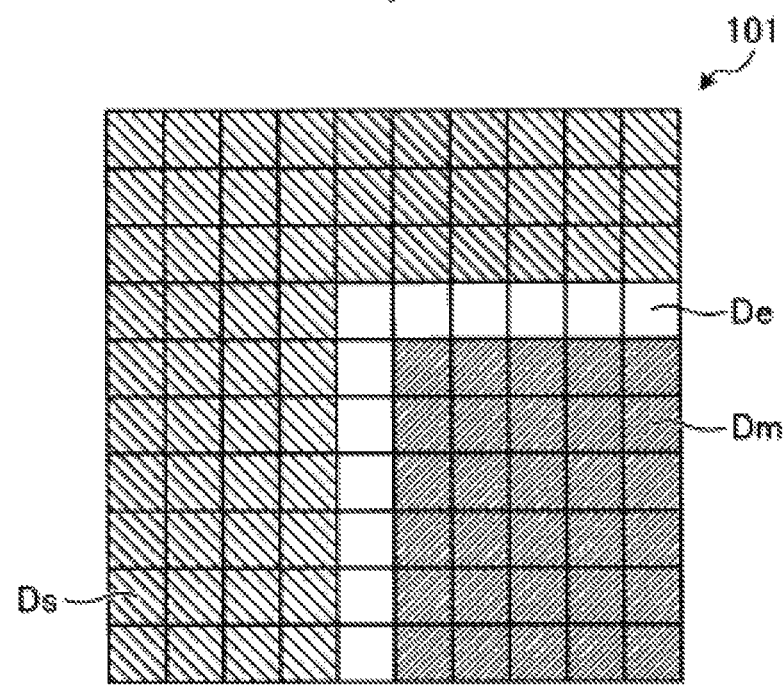

FIG. 7 illustrates an example of two-dimensional data 101, which represents positions of the support material and the build material to be extruded to the support surface 16a. The upper half of FIG. 7 illustrates an initial stage of a forming operation (which is when the environment temperature is T1). The dot number setting unit 90, after the start of the forming operation, determines whether the environment temperature measured by the measurer 60 is higher than a predetermined temperature. For example, assume that the environment temperature measured by the measurer 60 is the environment temperature T1, which is the initial temperature and lower than a predetermined temperature of T2. In this case, when a dot region Ds for the support material abuts a dot region Dm for the build material in the two-dimensional data 101, the dot number setting unit 90 sets the size of the gap between the dot region Ds and the dot region Dm at D1, that is, a size equivalent to zero dot. Thus, at the environment temperature T1, the support material and the build material are in contact with each other.

When the environment temperature Tn (Tn=T1) is higher than the predetermined temperature (fir example, T2), the dot number setting unit 90 sets a gap equivalent to at least one dot of the build material between the support material and the build material. That is, as illustrated in the lower half of FIG. 7, some of the dot positions originally intended for the build material are left without the build material. As a result, an empty dot region De is formed in the two-dimensional data 101 between the dot region Ds for the support material and the dot region Dm for the build material. Next, the dot number setting unit 90 sets a dot number for the empty dot region De. In this case, the dot number setting unit 90 obtains from the dot number data storage 96 a dot number Dn corresponding to the environment temperature Tn. Then, the dot number setting unit 90 updates the previous forming condition of dot number using the new forming condition, namely, the obtained dot number Dn. After the previous forming condition has been updated, the empty dot region De is formed between the support material and the build material as illustrated in the lower half of FIG. 7. The dot region De is equivalent to Dn dots of the build material (Dn is one in the embodiment illustrated in the lower half of FIG. 7).

As the environment temperature is increases, the build material 5a on the support surface 16a expands over a wider area. In this embodiment, the gap between the support material and the build material is enlarged as the environment temperature measured by the measurer 60 is higher. The enlarged gap prevents the build material from expanding and being mixed with the support material. The build material more widely expands than the support material when the environment temperature increases. In view of the circumstances, in this embodiment, the dot number setting unit 90 reduces the region of the build material, and this improves the reliability with which mixture of the build material with the support material is eliminated or minimized.

Figure 8:
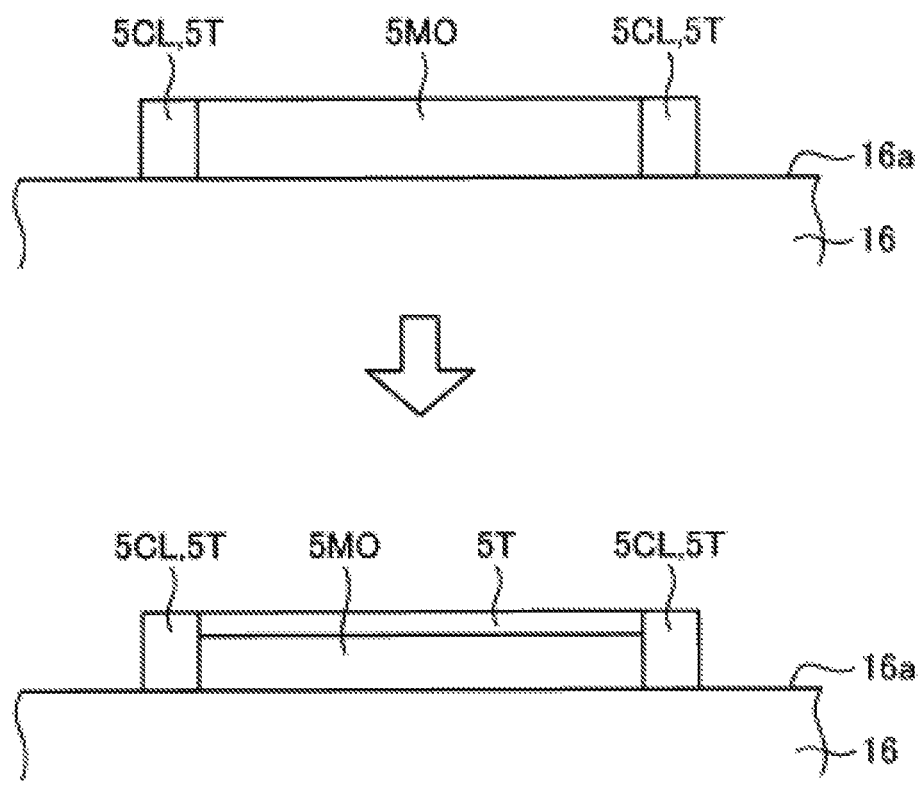
FIG. 8 illustrates a comparison between a pre-update forming operation, which is before a forming condition is updated, and a post-update forming operation, which is after the forming condition is updated.

FIG. 8 illustrates an example of change in the amount of extrusion of the clear ink from the clear-ink head 38. The upper half of FIG. 8 illustrates initial stage of a forming operation (which is when the environment temperature is T1). As illustrated in the upper half of FIG. 8, a lower layer of the three-dimensional object 5 is formed on the support surface 16a of the platform 16 and extends in the rightward and leftward directions of FIG. 8. At the ends in the rightward and leftward directions of the lower layer, mixed portions 5CL-5T are formed. Each of the mixed portions 5CL-5T is a mixture of a color ink portion 5CL and a clear ink portion 5T, and serves as an outer surface of the lower layer. Between the mixed portions 5CL-5T a build portion 5MO is formed. The extrusion amount setting unit 91, after the start of the forming operation, determines whether the environment temperature measured by the measurer 60 is higher than the predetermined temperature. For example, assume that the environment temperature measured by the measurer 60 is the environment temperature T1, which is the initial temperature and lower than the predetermined temperature. In this case, the extrusion amount setting unit 91 causes no clear ink to be extruded to the position in the build portion 5MO to which the build material 5a is extruded. That is, at the environment temperature T1, the build portion 5MO is entirely formed of the build material 5a.

When the environment temperature Tn (Tn>T1) is higher than the predetermined temperature (for example, T2), the extrusion amount setting unit 91 causes the clear-material extrusion head 38 to extrude clear ink to the position in the build portion 5MO to which the build material 5a is extruded. The predetermined temperature may be conveniently set based on, for example, an experiment and/or a simulation. Next, the extrusion amount setting unit 91 sets, based on the environment temperature measured by the measurer 60, the amount of extrusion of clear ink to be added to the build material 5a. In this case, the dot number setting unit 90 obtains from the extrusion amount data storage 97 an extrusion amount Qn corresponding to the environment temperature Tn. Then, the extrusion amount setting unit 91 updates the previous forming condition of extrusion amount using the new forming condition, namely, the obtained extrusion amount Qn. After the previous forming condition has been updated, as illustrated in the lower half of FIG. 8, a clear ink 51 is extruded to the position in the build portion 5MO to which the build material 5a is extruded. Thus, the volume of the portion between the mixed portions 5CL-5T is a total of the volume of the build material 5a of the build portion 5MO and the volume of the clear ink 5T.

As the environment temperature increases, the build material 5a on the support surface 16a expands over a wider area. This causes a lowered height of the deposited build material 5a, even though the volume of the build material 5a remains the same before and after the environment temperature increases. In light of the circumstances, in this embodiment, clear ink is added to the position of the build portion 5MO so that the resulting portion has a sufficient deposition height.

Figure 9:
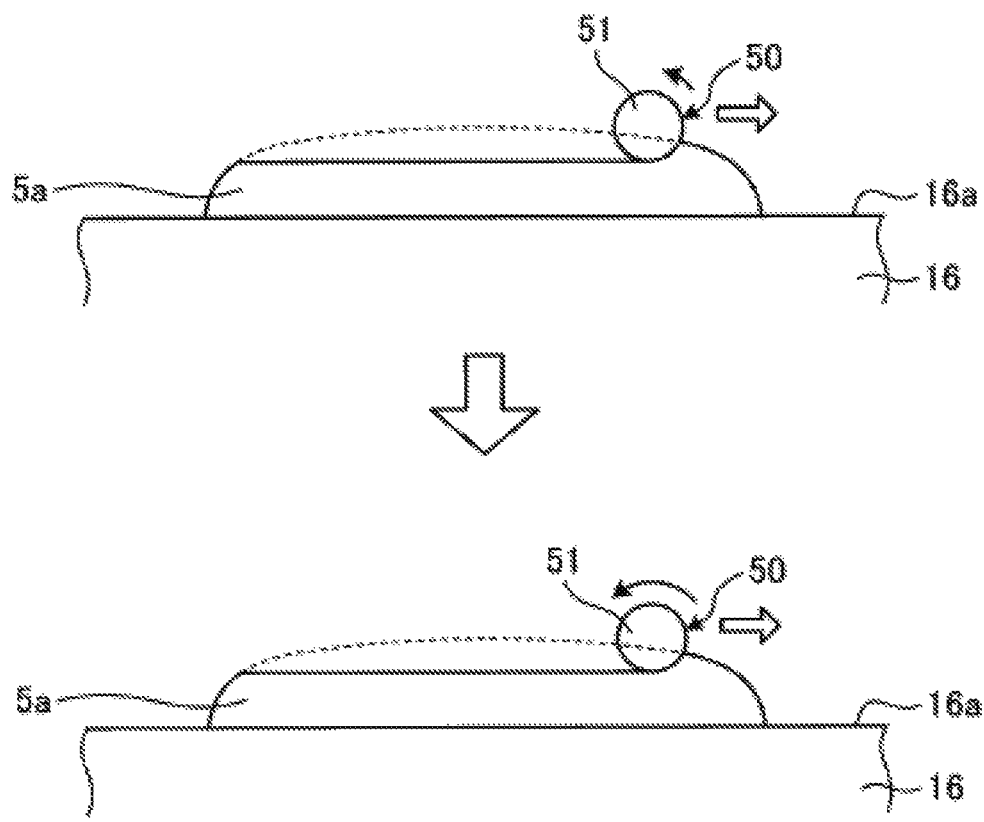
FIG. 9 illustrates a comparison between a pre-update forming operation, which is before a forming condition is updated, and a post-update forming operation, which is after the forming condition is updated.

FIG. 9 illustrates an example of change in the rotation speed of the flattening roller 51 of the flattening roller unit 50. The upper half of FIG. 9 illustrates an initial stage of a forming operation (which is when the environment temperature is T1). In this case, the flattening roller 51 of the flattening roller unit 50 passes across an upper portion of the build material 5a on the support surface 16a of the platform 16 while rotating at a predetermined rotation speed.

When, from this initial stage, the environment temperature increases and the environment temperature measured by the measurer 60 is Tn (Tn>T1), the roller rotation speed setting unit 92 obtains from the rotation speed data storage 98 a rotation speed Rn corresponding to the environment temperature Tn. Then, the roller rotation speed setting unit 92 updates the previous forming condition of rotation speed using the new forming condition, namely, the obtained rotation speed Rn. After the previous forming condition has been updated, as illustrated in the lower half of FIG. 9, the flattening roller 51 of the flattening roller unit 50 is rotating on the upper portion of the build material 5a on the support surface 16a at a higher rotation speed than the pre-update rotation speed.

As the environment temperature increases, the build material 5a on the support surface 16a increases in viscosity. If the build material 5a increases in viscosity, the build material 5a becomes more liable to adhere to the flattening roller 51 and more liable to move together with the flattening roller 51. In light of the circumstances, in this embodiment, as the environment temperature measured by the measurer 60 is higher, the rotation speed of the flattening roller 51 increases. This configuration makes it more difficult for the flattening roller 51 to adhere to the build material 5a. This configuration, in turn, eliminates or minimizes the movement of the build material 5a together with the movement of the flattening roller 51.

Figure 10:
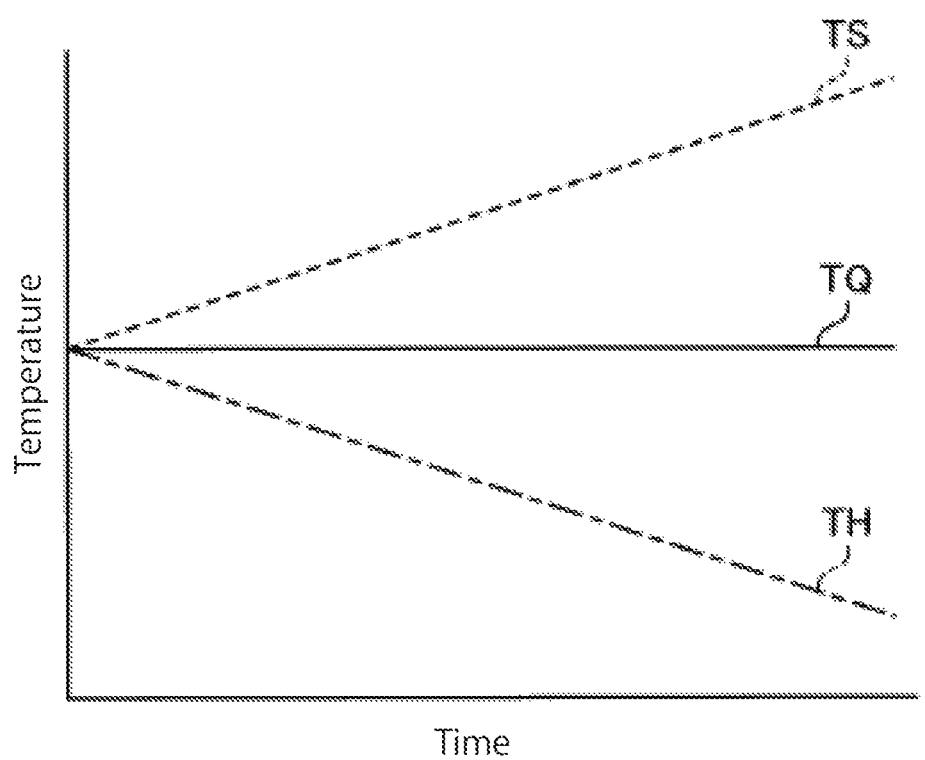
FIG. 10 is a graph showing how the temperature of an ink path changes with time.

FIG. 10 is a graph showing how the temperature of each ink path, including the corresponding head, changes with time. In the graph of FIG. 10, the horizontal axis denotes time and the vertical axis denotes temperature from the start of a forming operation. It will be understood that the graph of FIG. 10 is not intended in a limiting sense. In FIG. 10, line TS denotes change in environment temperature; line TQ denotes the temperature of the build material on the support surface 16a, that is, the temperature of the build material after hitting the support surface 16a; and line TH denotes the temperature of the build-material extrusion head 34, which is part of a path for the build material.

As the line TS in FIG. 10 indicates, when the three-dimensional-object forming apparatus 10 performs a forming operation, the environment temperature increases with time, from the start of the forming operation, due to heat from the ultraviolet light sources 44, for example. Without temperature regulation of the path for the build material, the temperature of the build material after hitting the support surface 16a increases as the environment temperature increases. In light of the circumstances, in this embodiment, as the lines TQ and TH indicate, the ink path temperature setting unit 93 decreases the temperature of the build-material extrusion head 34 as the environment temperature increases. In this manner, the ink path temperature setting unit 93 keeps approximately uniform the temperature of the build material after hitting the support surface 16a. This configuration eliminates or minimizes change in properties, such as viscosity, of the build material after hitting the support surface 16a, even though the environment temperature increases.

As the environment temperature increases, the build material 5a on the support surface 16a increases in viscosity. If the build material 5a increases in viscosity, the build material 5a becomes more liable to adhere to the flattening roller 51 and more liable to move together with the flattening roller 51. In light of the circumstances, in this embodiment, as the environment temperature measured by the measurer 60 is higher, the rotation speed of the flattening roller 51 increases. This configuration makes it more difficult for the flattening roller 51 to adhere to the build material 5a. This configuration, in turn, eliminates or minimizes the movement of the build material 5a together with the movement of the flattening roller 51.

Figure 11:
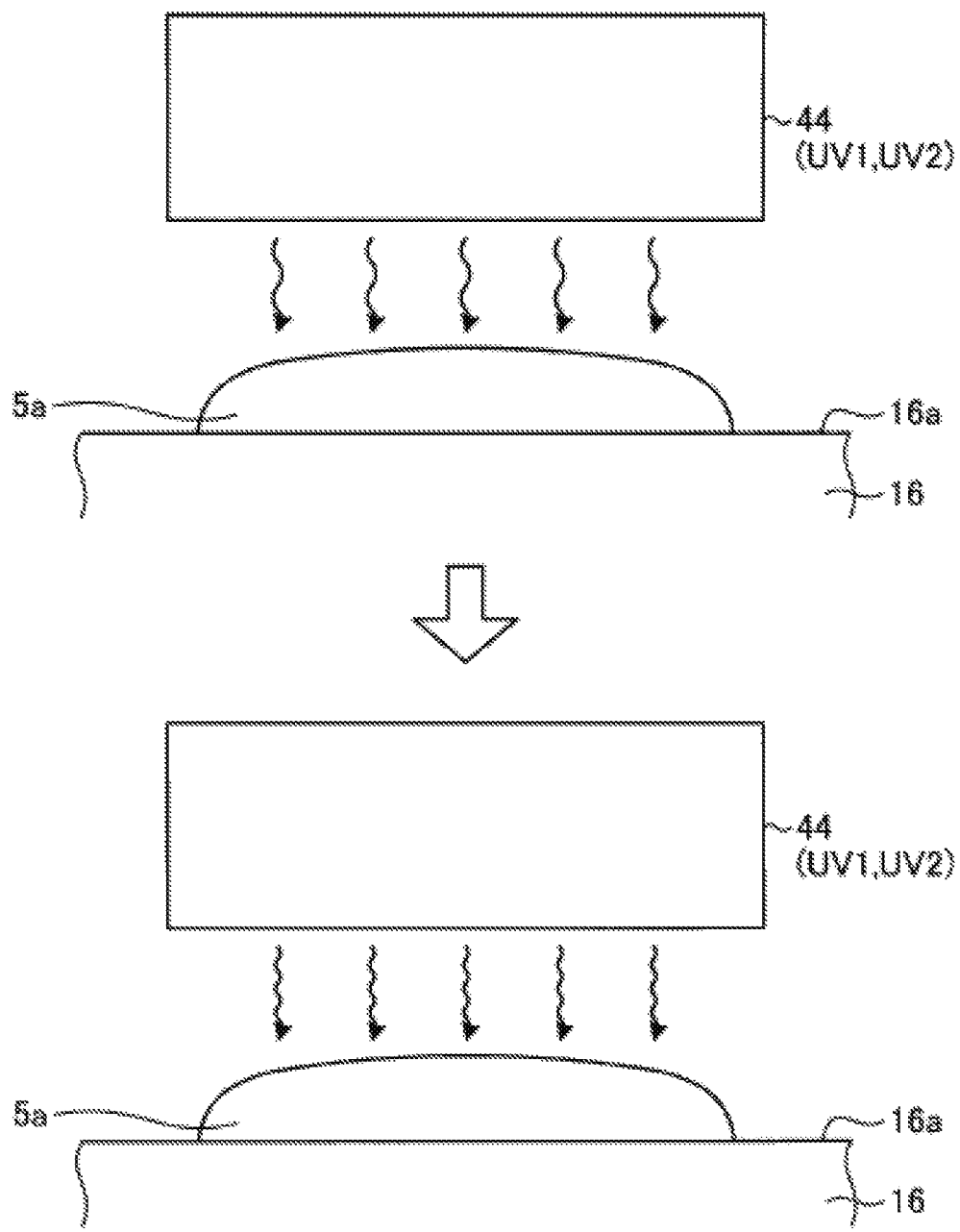
FIG. 11 illustrates a comparison between a pre-update forming operation, which is before a forming condition is updated, and a post-update forming operation, which is after the forming condition is updated.

FIG. 11 illustrates an example of change in the wavelength of the ultraviolet light. The upper half of FIG. 11 illustrates an initial stage of a forming operation (which is when the environment temperature is T1). The ultraviolet light sources 44 radiate ultraviolet light having a wavelength of λ1 to the build material 5a on the support surface 16a of the platform 16.

When, from this initial stage, the environment temperature increases and the environment temperature measured by the measurer 60 is Tn (Tn>T1), the wavelength setting unit 94 obtains from the wavelength data storage 100 a wavelength λn corresponding to the environment temperature Tn. Then, the wavelength setting unit 94 updates the previous forming condition of wavelength using the new forming condition, namely, the obtained wavelength λn. After the previous forming condition has been updated, as illustrated in the lower half of FIG. 11, the ultraviolet light sources 44 radiate, to the build material 5a on the support surface 16a, ultraviolet light having a shorter wavelength than the pre-update wavelength.

As the environment temperature increases, the internal curing speed at which the build material 5a on the support surface 16a cures on the inside increases. In this respect, the inventor has found that oxygen in the air interferes in the curing of the surface of the build material 5a on the support surface 16a, resulting in lowered surface curing speed at which the build material 5a cures on the surface. In light of the finding, in this embodiment, the illuminance of the ultraviolet light radiated from the ultraviolet light sources 44 is higher than the illuminance before the environment temperature increases. This configuration increases the surface curing speed at which the build material 5a cures on the surface. This configuration, in turn, eliminates or minimizes a difference in curing speed between the surface and inside of the build material 5a. This configuration, as a result, eliminates or minimizes bending of the three-dimensional object 5.

It is possible to change one or some of the above-described forming conditions.

Then, the controller 18 determines whether to end the forming operation (step S60). When the controller 18 has determined to end the forming operation (Yes at step S60), the controller 18 controls the elements of the three-dimensional-object forming apparatus 10 to stop operating, thereby ending the forming operation (step S70). When the controller 18 has determined not to end the forming operation (No at step S60), the controller 18 repeats the operations at and after step S40.

As has been described hereinbefore, the three-dimensional-object forming apparatus 10 according to this embodiment updates, during a forming operation, forming conditions based on temperature around the three-dimensional object 5, and performs the forming operation under the updated forming conditions. This configuration eliminates or minimizes unevenness of the surface state of the extruded ink when the ink hits the support surface. As a result, the three-dimensional object 5 is formed with improved accuracy.

Obviously, numerous modifications and variations of the present disclosure are possible in light of the above teachings. It is therefore to be understood that within the scope of the appended claims, the present disclosure may be practiced otherwise than as specifically described herein. For example, in the above-described embodiment, the dot number setting unit 90 sets gap size, that is, dot number by forming a gap equivalent to at least one dot of the build material. This configuration, however, is not intended in a limiting sense. Another possible embodiment is that the dot number setting unit 90 forms a gap equivalent to at least one dot of the support material.

5 three-dimensional object
6 support
10 three-dimensional-object forming apparatus
12 extrusion unit
14 main scanning driver
16 platform
18 controller
22 carriage
24 guide rail
32c, 32k, 32m, 32y color-ink head
34 build-material extrusion head
36 while-ink head
38 clear-ink head
40 support-material extrusion head
44 ultraviolet light source
50 flattening roller unit, the flattening roller
51 flattening roller 52 excess build material collection mechanism
60 measurer
81 inputter
82 outputter
83 processing unit
84 storage
86 drive control unit
87 head control unit
88 forming condition setting unit
89 illuminance setting unit
90 dot number setting unit
91 extrusion amount setting unit
92 roller rotation speed setting unit
93 ink path temperature setting unit
94 wavelength setting unit
95 illuminance data storage
96 dot number data storage
97 extrusion amount data storage
98 rotation speed data storage
99 path temperature data storage
100 wavelength data storage
101 two-dimensional data
DE illuminance data
DH path temperature data
DD dot number data
DQ extrusion amount data
DR rotation speed data
DT temperature data
DW wavelength data

What is claimed is:

1. A three-dimensional-object forming apparatus comprising:
  a platform comprising a support surface on which a three-dimensional object is supportable;
  a build-material extrusion head movable relative to the platform in a main scanning direction and a sub-scanning direction and configured to extrude a build material to the support surface to form the three-dimensional object, the main scanning direction being approximately parallel to the support surface, the sub-scanning direction being approximately parallel to the support surface and crossing the main scanning direction;
  a plurality of color-ink heads movable together with the build-material extrusion head, each color-ink head configured to extrude droplets of a different color ink to the support surface to form the three-dimensional object;
  a light irradiation device;
  a measurer configured to continuously measure an environment temperature around the three-dimensional object supported on the support surface; and
  a controller configured to control operation of the platform, the build-material extrusion head, the plurality of color-ink heads, and the light irradiation device under forming conditions required to form the three-dimensional object, the forming conditions comprising conditions for moving the build-material extrusion and the plurality of color-ink heads relative to the platform, conditions for controlling extruding of the build material from the build-material extrusion head and of the color inks from the plurality of color-ink heads to the support surface, and conditions for operating the light irradiation device,
  wherein the build material and the color inks are photo-curable materials,
  wherein the light irradiation device is configured to irradiate light to the build material and color inks extruded onto the support surface, the light is configured to cure the build material and the color inks, and
  wherein the controller is configured to receive the environment temperature measured by the measurer, to control the light irradiation device based on the received environment temperature, and to increase illuminance of the light irradiated by the light irradiation device as the environment temperature measured by the measurer increases.

2. The three-dimensional-object forming apparatus according to claim 1, further comprising a support-material extrusion head movable together with the build-material extrusion head and configured to extrude a support material to the support surface to support the build material,
  wherein the controller is further configured to control operation of the support-material extrusion head,
  wherein when the build material is extruded to a first region on the support surface and the support material is extruded to a second region abutting the first region on the support surface, a size of a gap between the extruded build material and the support material is a further forming condition, and
  wherein when the environment temperature measured by the measurer exceeds a predetermined temperature, the controller is configured to make the size of the gap equivalent to at least one dot of the build material and configured to increase the size of the gap as the environment temperature measured by the measurer increases.

3. The three-dimensional-object forming apparatus according to claim 1, further comprising a clear-material extrusion head movable together with the build-material extrusion head and configured to extrude a clear material to the support surface,
  wherein the controller is further configured to control operation of the clear-material extrusion head,
  wherein an amount of extrusion of the clear material is a further forming condition, and
  wherein when the environment temperature measured by the measurer exceeds a predetermined temperature, the controller is configured to control the clear-material extrusion head to extrude the clear material to a position to which the build material is extruded and configured to increase the amount of extrusion of the clear material as the environment temperature measured by the measurer increases.

4. The three-dimensional-object forming apparatus according to claim 1, further comprising a flattening roller configured to rotate on the build material on the support surface and configured to travel across the support surface in a direction approximately parallel to the support surface so as to flatten the build material,
  wherein the controller is further configured to control operation of the flattening roller,
  wherein a rotation speed of the flattening roller is a further forming condition, and
  wherein the controller is configured to increase the rotation speed as the environment temperature measured by the measurer increases.

5. The three-dimensional-object forming apparatus according to claim 1, further comprising a temperature regulator configured to monitor and adjust a temperature of a path for the build material, the path comprising the build-material extrusion head and a supply unit,
  wherein the controller is further configured to control operation of the temperature regulator, wherein the temperature of the path for the build material is a further forming condition, and
wherein the controller is configured to lower the temperature of the path as the environment temperature measured by the measurer increases.

6. The three-dimensional-object forming apparatus according to claim 1, wherein the wavelength of the light irradiated from the light irradiation device to the build material on the platform is a further forming condition, and wherein the controller is configured to shorten the wavelength as the environment temperature measured by the measurer increases.

7. The three-dimensional-object forming apparatus according to claim 2, further comprising a clear-material extrusion head movable together with the build-material extrusion head and configured to extrude a clear material to the support surface,
wherein the controller is further configured to control operation of the clear-material extrusion head,
wherein an amount of extrusion of the clear material is a further forming condition, and
wherein when the environment temperature measured by the measurer exceeds the predetermined temperature, the controller is configured to control the clear-material extrusion head to extrude the clear material to a position to which the build material is extruded and configured to increase the amount of extrusion of the clear material as the environment temperature measured by the measurer increases.

8. The three-dimensional-object forming apparatus according to claim 5, further comprising a clear-material extrusion head movable together with the build-material extrusion head and configured to extrude a clear material to the support surface,
wherein the controller is further configured to control operation of the clear-material extrusion head,
wherein an amount of extrusion of the clear material is a further forming condition, and
wherein when the environment temperature measured by the measurer exceeds a predetermined temperature, the controller is configured to control the clear-material extrusion head to extrude the clear material to a position to which the build material is extruded and configured to increase the amount of extrusion of the clear material as the environment temperature measured by the measurer increases.

9. The three-dimensional-object forming apparatus according to claim 5, further comprising a flattening roller configured to rotate on the build material on the support surface and configured to travel across the support surface in a direction approximately parallel to the support surface so as to flatten the build material,
wherein the controller is further configured to control operation of the flattening roller,
wherein a rotation speed of the flattening roller is a further forming condition, and
wherein the controller is configured to increase the rotation speed as the environment temperature measured by the measurer increases.

10. The three-dimensional-object forming apparatus according to claim 2, further comprising a flattening roller configured to rotate on the build material on the support surface and configured to travel across the support surface in a direction approximately parallel to the support surface so as to flatten the build material,
wherein the controller is further configured to control operation of the flattening roller,
wherein a rotation speed of the flattening roller is a further forming condition, and
wherein the controller is configured to increase the rotation speed as the environment temperature measured by the measurer increases.

11. The three-dimensional-object forming apparatus according to claim 3, further comprising a flattening roller configured to rotate on the build material on the support surface and configured to travel across the support surface in a direction approximately parallel to the support surface so as to flatten the build material,
wherein the controller is further configured to control operation of the flattening roller,
wherein a rotation speed of the flattening roller is a further forming condition, and
wherein the controller is configured to increase the rotation speed as the environment temperature measured by the measurer increases.

12. The three-dimensional-object forming apparatus according to claim 6, further comprising a flattening roller configured to rotate on the build material on the support surface and configured to travel across the support surface in a direction approximately parallel to the support surface so as to flatten the build material,
wherein the controller is further configured to control operation of the flattening roller,
wherein a rotation speed of the flattening roller is a further forming condition, and
wherein the controller is configured to increase the rotation speed as the environment temperature measured by the measurer increases.

13. The three-dimensional-object forming apparatus according to claim 7, further comprising a flattening roller configured to rotate on the build material on the support surface and configured to travel across the support surface in a direction approximately parallel to the support surface so as to flatten the build material,
wherein the controller is further configured to control operation of the flattening roller,
wherein a rotation speed of the flattening roller is a further forming condition, and
wherein the controller is configured to increase the rotation speed as the environment temperature measured by the measurer increases.

14. The three-dimensional-object forming apparatus according to claim 6, further comprising a temperature regulator configured to monitor and adjust a temperature of a path for the build material, the path comprising the build-material extrusion head and a supply unit,
wherein the controller is further configured to control operation of the temperature regulator,
wherein the temperature of the path for the build material is a further forming condition, and
wherein the controller is configured to lower the temperature of the path as the environment temperature measured by the measurer increases.

15. The three-dimensional-object forming apparatus according to claim 2, further comprising a temperature regulator configured to monitor and adjust a temperature of a path for the build material, the path comprising the build-material extrusion head and a supply unit,
wherein the controller is further configured to control operation of the temperature regulator,
wherein the temperature of the path for the build material is a further forming condition, and wherein the controller is configured to lower the temperature of the path as the environment temperature measured by the measurer increases.

\* \* \* \* \*